United States Patent [19]
Wetterlin

[11] Patent Number: 4,805,811
[45] Date of Patent: Feb. 21, 1989

[54] DOSAGE DEVICE
[75] Inventor: Kjell I. L. Wetterlin, S. Sandby, Sweden
[73] Assignee: Aktiebolaget Draco, Lund, Sweden
[21] Appl. No.: 175,174
[22] Filed: Mar. 30, 1988

Related U.S. Application Data
[63] Continuation-in-part of Ser. No. 717,539, Mar. 29, 1985, abandoned.

[51] Int. Cl.$^4$ .............................................. G01F 11/24
[52] U.S. Cl. ................................... 222/337; 222/342; 222/360; 222/368
[58] Field of Search ....................... 222/190, 337–338, 222/342, 345, 347, 349–350, 359–360, 367–368

[56] References Cited
U.S. PATENT DOCUMENTS

| | | | |
|---|---|---|---|
| 166,638 | 8/1875 | Sears | 222/349 |
| 851,750 | 4/1907 | Hodges | 222/350 |
| 1,626,205 | 4/1927 | Messer | 222/190 |
| 1,884,478 | 10/1932 | Woods | 222/294 |
| 2,587,215 | 2/1952 | Priestly | 128/206 |

FOREIGN PATENT DOCUMENTS

| | | | |
|---|---|---|---|
| 2052051 | 4/1972 | Fed. Rep. of Germany . | |
| 1087648 | 2/1955 | France | 222/190 |

Primary Examiner—Charles A. Marmor
Attorney, Agent, or Firm—Brumbaugh, Graves, Donohue & Raymond

[57] ABSTRACT

A dosage device for dosing with high accuracy a particulate material containing a pharmacologically active substance, including a storage chamber, a rotatable dosing unit adjacent the storage chamber, and an operating unit to cause relative rotation between the dosing unit and the storage chamber. The dosing unit is provided with a plurality of upwardly opening recesses opening into said storage chamber to receive particulate material therefrom through an outlet opening from the storage chamber. Scrapers are positioned in the outlet opening immediately above these recesses to pack and level the particulate material into the recesses and level the material off with the upper surface of the dosing unit as the dosing unit rotates relative to the storage chamber. The operating unit causes an indexing of the dosing unit between discrete rotational positions in one of which one of the recesses is in direct communication with a generally upwardly extending dispensing channel so that when the unit is turned upside down, the contents of that recess will be discharged through the channel.

3 Claims, 3 Drawing Sheets

DOSAGE DEVICE

This is a continuation-in-part of application Ser. No. 717,539 filed Mar. 29, 1985 now abandoned.

BACKGROUND OF THE INVENTION

The present invention relates to a new dosage device intended to be used for dosing of micronized or granulated substances or microcapsules (hereinafter referred to collectively as particulate material) and containing pharmacologically active substances.

Several preparations of drugs are nowadays administered in micronized or granulated form or in the form of microcapsules. These substances are filled into capsules of hard gelatine, which are intended for oral administration and are swallowed whole by the patient. Children and adults who have difficulty swallowing a whole capsule are often advised to open the capsule and spread the contents on a suitable piece of food and to swallow the food. It is, however, difficult to open the capsule and pour out the contents without any loss of the substance. Capsules of hard gelatine are an expensive, but effective, way to administer pharmacologically active substances to patients who are able to swallow the capsules unbroken. It is, however, not sensible to use this expensive way of dispensing into capsules of hard gelatine, when the patient later on, with some difficulty, opens the capsule and pours out the contents.

It has previously been proposed to provide dosage devices to enable the particulate material to be dispensed accurately. For example DE-A No. 2 052 051 describes a dosage device comprising an operating unit and a storage chamber. The operating unit is fitted relatively loosely to the casing of the device. Substances having small particles thus easily fall on the sliding surfaces between the two relatively movable units, so that substance being fed jams. With such a dosage device, which does not have a feeding under force, it is difficult to dose small amounts of micronized or granulated substances with an accuracy which is sufficient for the dispensing of drugs.

SUMMARY OF THE INVENTION

According to the present invention there is provided a dosage device for dosing with high accuracy a particulate material containing a pharmacologically active substance comprising a storage chamber, a rotatable dosing unit adjacent the storage chamber, and an operating unit to cause relative rotation between the dosing unit and the storage chamber. A plurality of upwardly opening recesses in the dosing unit, at least one of which opens into the storage chamber, receive particulate material from the storage chamber. A scraper in the outlet opening of the storage chamber packs the particulate material into the recess and levels it off with the upper surface of the dosing unit as the dosing unit rotates relative to the storage chamber. An operating mechanism on the operating unit causes indexing of the dosing unit between discrete rotational positions. A generally upwardly extending dispensing channel positioned at one of the discrete positions communicates with one of said recesses, so that that recess may be emptied by turning on the device upside down.

With the construction according to the present invention, the substance is prevented from getting into contact with the sliding surfaces in the two relatively movable parts of the dosage device and in this way feeding of each dose can be achieved without any problems. In the dosage device according to the invention, the scrapers make it possible to fill the recesses in the dosing unit in an accurately reproducable way. A high dosage accuracy can thus be obtained by the rotation of the dosing unit.

In order that the invention may more readily be understood, the following description is given, merely by way of example, reference being made to the accompanying drawings.

DESCRIPTION OF EXEMPLARY EMBODIMENT

Figure 1:
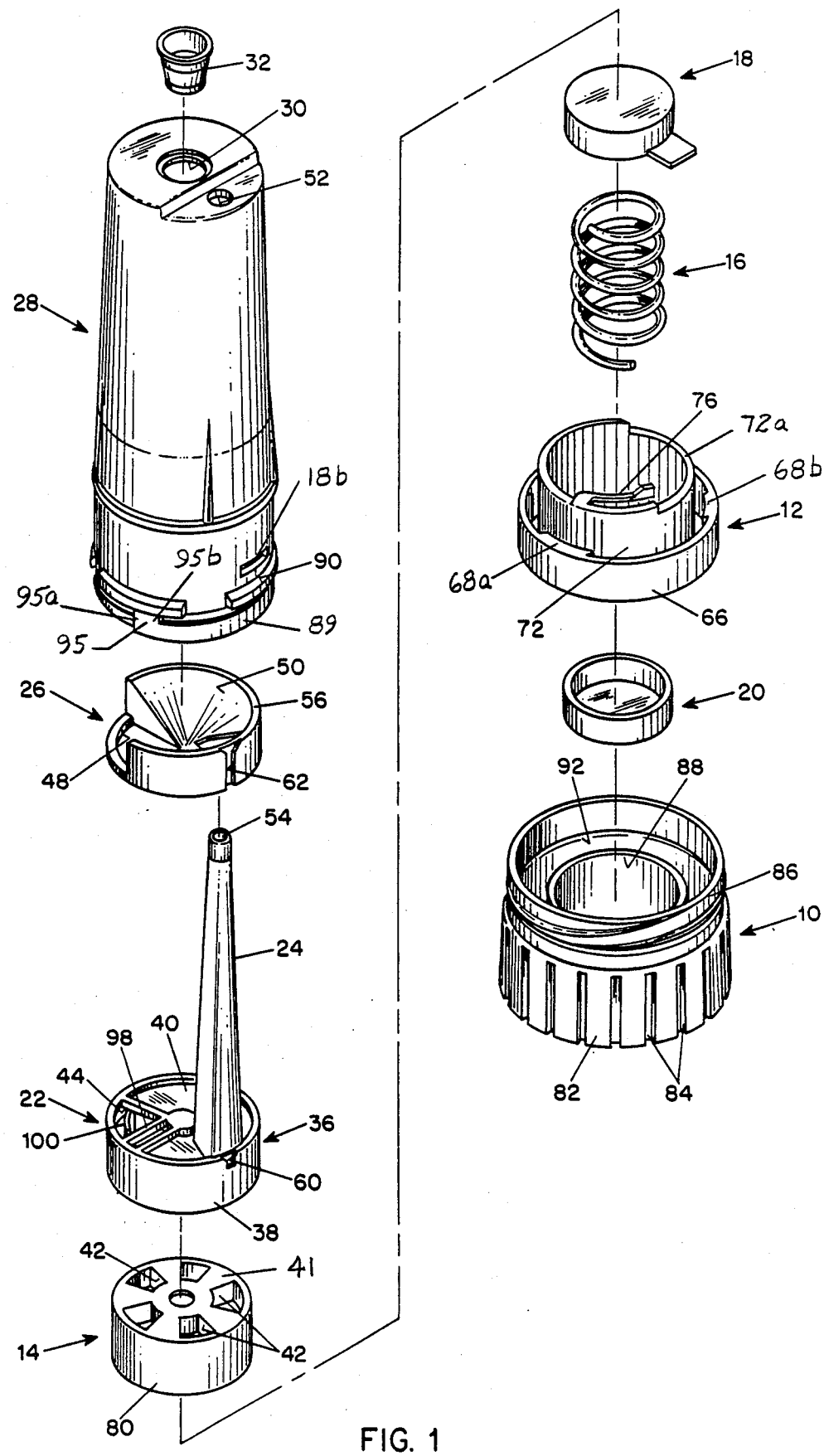
FIG. 1 is an exploded pictorial view of the embodiment.

The dosage device of the present invention, is preferably produced in plastic and can be considered to comprise four separate units as follows:

an operating unit at the bottom, which comprises an operating member 10 and a ratchet drive member 12;

a spring-loaded dosage dispensing unit, which comprises a dosing member 14, a coil compression spring 16, and spring holders 18 and 20;

a scraping unit 22, which incorporates a dispensing tube 24 and to which is fitted a funnel-like feed element 26; and a storage chamber cup 28 having a fill opening 30 closed by a cap 32; the cup 28, scraping unit 22, dosing member 14 and feed element 26, together, constitute a storage chamber for the particulate material.

Figure 2:
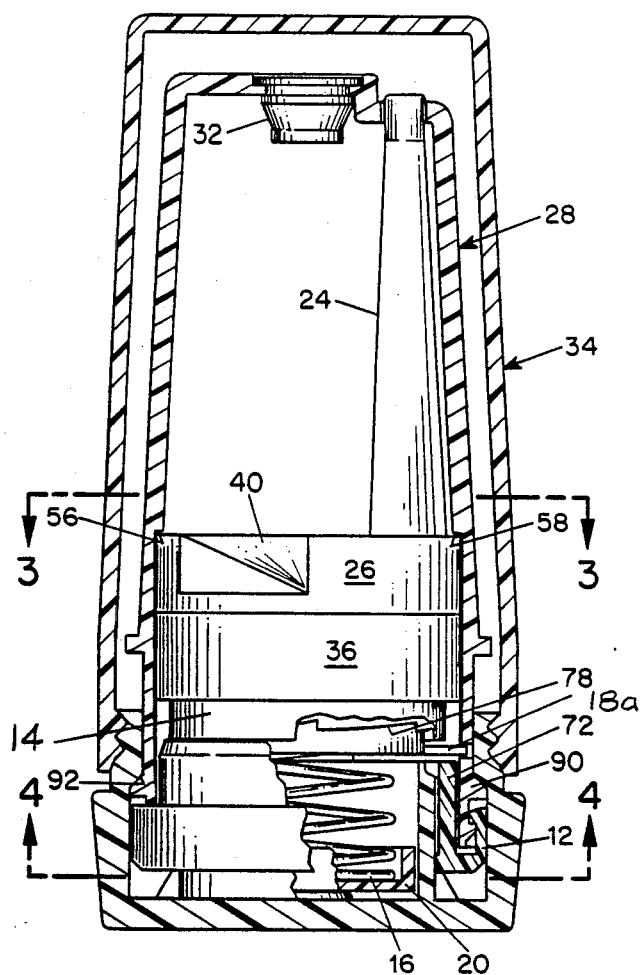
FIG. 2 is a side cross-sectional view of the embodiment.

Optionally, but desirably, a metal or plastic cover 34 (FIG. 2) fits over the device and threads (or snaps) onto the operating member 10.

Figure 3:
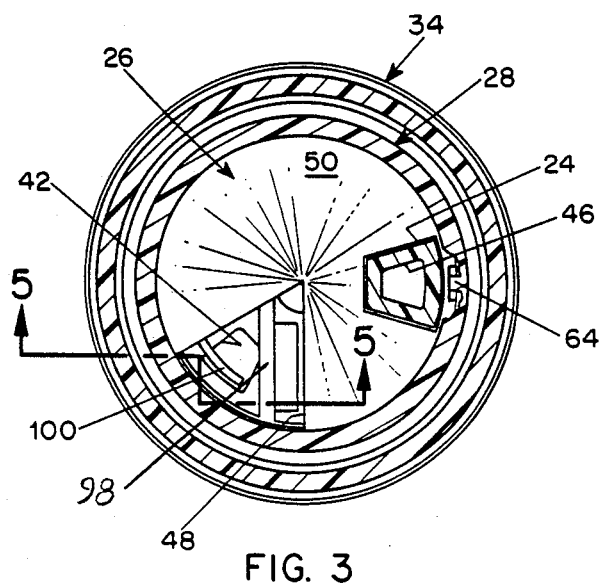
FIG. 3 is a top cross-sectional view taken along the lines 3—3 of FIG. 2.

The scraping unit 22 has a cup-shaped base portion 36 consisting of a peripheral flange 38 dependent from a wall 40. The dosage member 14, which is also generally cup-shaped, is received telescopically within the scraping unit 22 such as to bring the top face of its wall portion 41 into engagement with the bottom face of the wall portion 40 of the scraping unit. Uniformly spaced radially from the center of the dosage member and circumferentially from each other are five identical recesses 42. As described below, the dosage member 14 is rotated relative to the scraping unit 22 such as to bring sequentially each recess 42 first into register with an outlet opening 44 in the wall 40 of the scraping unit 22 and then into register with an opening 46 at the lower end of the dispensing tube 24 (see. FIG. 3).

The feed element 26 has an opening 48 that matches the outlet opening 44, a conical wall 50 that directs the contents of the storage chamber toward the openings 44 and 48, and an opening for the dispensing tube 24, which extends upwardly through the storage chamber cup 28 and protrudes through a hole 52 in the top of the storage chamber cup. The particulate material passes through a passage in the tube 24 and is released through the opening 54 at the upper end of the passage. As may best be seen in FIG. 2, the scraping unit 22 and feed element 26 are received in nested relation with each other within the lower end of the storage chamber cup 28. The upper peripheral edge 56 of the feed element 26 bears against a shoulder 58 on the inner wall of the storage chamber 28. Notches 60 and 62 (see FIGS. 1 and 3) in the flange portions of the scraping unit 22 and feed element 26 receive a rib 64 on the inner wall of the storage chamber cup 28 to maintain the scraping unit 22 and feed element 26 in circumferentially fixed positions in the storage chamber cup 28.

Figure 4:
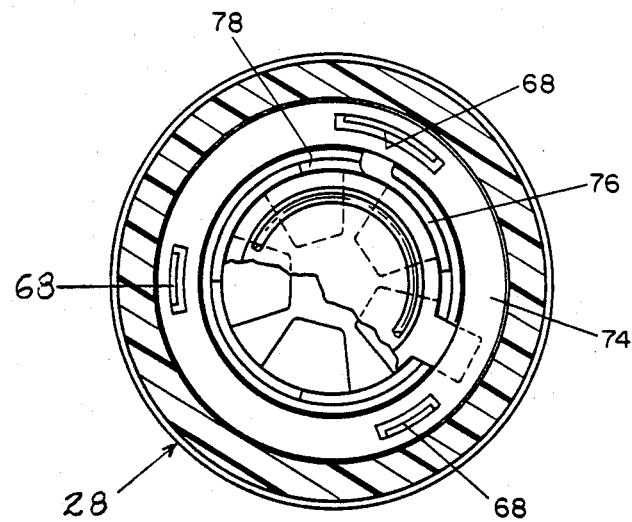
FIG. 4 is a bottom cross-sectional view taken along the lines 4—4 of FIG. 2.

The ratchet drive member 12 comprises an outer flange portion 66 having internal lugs 68, an inner flange portion 72 and an annular bottom wall portion 74 (see FIG. 4), joining the flange portions 66 and 72. (The slots in the wall portion 74 visible in FIG. 4 are left by elements of the mold that form the lugs 68.) A resilient pawl 76, which is offset radially inwardly and extends upwardly from the flange portion 72, is engageable with ratchet teeth 78 formed along the internal lower portion of the flange 80 of the dosage member 14.

The operating member 10 has an outer flange portion 82 having grooves 84 on its outer surface to facilitate gripping it by the thumb and fingers, a threaded portion 86 that receives the cover 34, and an inner flange portion 88. The ratchet drive member 12 is received with a force fit telescopically within the annular space between the flange portions 82 and 88 of the operating member 10 (see FIGS. 2 and 3). Accordingly, the operating member 10 and ratchet drive member 12 are joined as a unit.

The operating member 10 snaps onto the lower rim of the cup 28 and is retained by engagement of retainer ribs 90 on the cup with an internal shoulder 92 on the outer flange portion 82. Similarly, the ratchet drive member 12 snaps onto the cup 28 and is retained by engagement of the lugs 68 with a retainer rib 89 on the cup. The rib 89 has bevelled notches corresponding to each lug 68 to facilitate snapping the ratchet drive member 12 onto the rim. The longer lug 68a ensures the correct circumferential relationship between the cup and drive member when they are snapped together. Between the notches, the rib 89 is squared off to the lower edge of the cup (see FIGS. 1 and 2). The cup rim is in sliding fit with the flange portions of the operating member 10 and ratchet drive member 12, so the operating member and ratchet drive member are rotatable as a unit relative to the cup 28.

The lower spring holder 20 is received within the inner flange portion 88 in engagement with the bottom wall of the operating member 10. The upper spring holder 18 is received within the dosing member 14 in engagement with the bottoms of the recesses 42. Accordingly, the spring 16 biases the dosing member toward the scraping unit 22, thereby maintaining firm engagement between the walls 40 and 41 such that particulate material is prevented from intruding between the walls 40 and 41. A lug 18a on the upper spring holder 18 is received in a hole 18b in the cup 28, which prevents the spring and spring retainers from rotating and possibly binding and recoiling when the device is operated. A notch 72a along the edge of the inner flange 72 of the ratchet drive member 12 provides an opening for the lug 18a, the notch being circumferentially long enough to allow the drive member 12 to rotate.

The rotation of the operating member 10 and ratchet drive member 12 (which rotate as a unit) relative to the storage chamber) is limited by engagement between a projection 95 (FIG. 1) on the outer surface of the rim of the cup and two of the lugs 68 on the ratchet drive member. Upon counterclockwise rotation (as viewed from the top) of the operating unit, the edge 95a of the projection is engaged by the lug 68a, and upon clockwise rotation, the edge 59b of the projection is engaged by the lug 68b. The locations of the projection 95, the lugs 68a and 68b, the pawl 76 and the ratchet teeth 78 are established such that upon counterclockwise rotation of the operating unit to the stop position, one of the recesses 42 in the dosing member 14 is in register with the hole 46 in the discharge passageway 24, and another recess 42 is in register with the outlet opening 44 from the storage chamber unit. At the stop position in the clockwise direction, the pawl is released from one ratchet tooth and is able to engage the next ratchet tooth. In between the two positions, the pawl remains in engagement with one ratchet tooth only.

Figure 5:
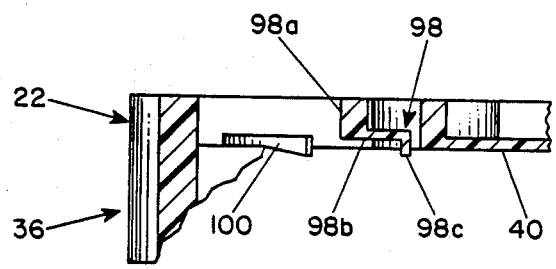
FIG. 5 is a partial, enlarged cross-sectional view of the scraping unit of the embodiment taken along the lines 5—5 of FIG. 3.
Figure 6:
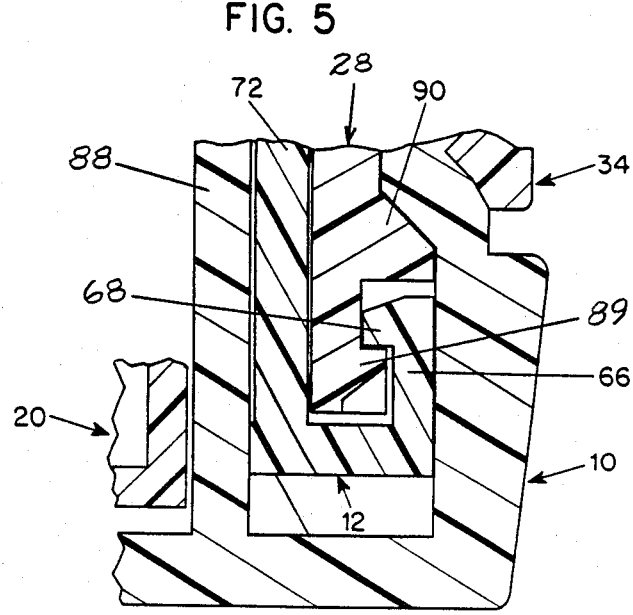
FIG. 6 is a fragmentary, side cross-sectional view on an enlarged scale of the bottom portion of the embodiment.

As each recess 42 resides in register with the discharge opening 44, medication flows into that recess. When the operating unit 10 and ratchet drive member are rotated counterclockwise from the clockwise stop position, a resilient scraper 98 that is formed integrally with the scraping unit 22 pushes and packs medication into the recess, and then removes excess medication above the recess to ensure that each recess contains a reproducible amount of medication. The scraper 98 (see FIGS. 3 and 5) includes a rib portion 98a that extends across the discharge opening 44, a horizontal wall portion 98b that is resilient and is integrally attached to the rib portion 98a, and a downwardly projecting lip portion 98c. As initially formed, the lower edge of the lip portion 98c lies below the lower face of the wall 40. Under the urging of the spring 16, the wall 41 of the dosing member 14 deforms the portion 98b of the scraper. A curved resilient finger 100 projects into the outlet opening 44 and tends to guide and agitate the particulate material in the outer portion of the recess 42. The wall portion 98b packs the particulate material into the recess, and the lip portion 98c strikes off the excess material. Upon further rotation counterclockwise, the filled recess moves to an idle station, where it is closed in filled condition by the wall 40 of the scraping unit. Meanwhile, a previously filled recess is advanced to the discharge opening 46, where it stops when the operating unit reaches the counterclockwise stop position. The contents may then be discharged by inverting the device. At this position, the device cannot be operated without "re-arming" it by rotating the operating unit clockwise to engage the next ratchet tooth.

The dosage device may be used as a container and aid in dispensing of a great number of active substances such as enprophylline, theophylline and terbutaline.

EXAMPLE

In order to demonstrate the dosage accuracy of the dosage device according to the present invention the following tests have been carried out with different dosing units with different sizes of the recesses A–G. The container was filled with Theo-Dur Sprinkle substance (which is a slow release microencapsulated preparation of theophylline) mixed with 1% and 2% of talcum respectively. When the dosage accuracy of 500 doses was established a maximum deviation of 3.5% was obtained. Cf. the table below.

Test with seven different dosage units containing Theo-Dur Sprinkle substance mixed with talcum The figures below are the average values of 500 doses from each dosage device.

| Dosage unit | Talcum | | | | | |
|---|---|---|---|---|---|---|
| | 1% | | | 2% | | |
| | mg/dose | $s_{rel}$ | % | mg/dose | $s_{rel}$ | % |
| A | 104.1 | 2.15 | 2.1 | 104.2 | 2.45 | 2.4 |
| B | 94.0 | 2.36 | 2.5 | 94.0 | 2.66 | 2.8 |
| C | 85.4 | 2.29 | 2.7 | 84.8 | 2.30 | 2.7 |
| D | 73.2 | 2.45 | 3.3 | 75.1 | 1.73 | 2.3 |
| E | 64.7 | 1.68 | 2.6 | 64.5 | 2.02 | 3.1 |
| F | 54.3 | 1.33 | 2.5 | 53.4 | 1.87 | 3.5 |
| G | 45.8 | 1.34 | 2.9 | 45.9 | 1.30 | 2.8 |

As a comparison reference is made to Pharm, Nord, which specifies that 90% of the capsules shall have a weight which does not deviate more than 10% from the stipulated weight. The rest shall not deviate more than 20%. With the new dosage device according to the invention these requirements are thus met with an ample margin.

I claim:

1. In a device for releasing a dosage of a particulate medication that includes:
   a dosage dispensing unit having a face with a plurality of recesses therein adapted to receive and meter a reproducible amount of said medication,
   a storage chamber adapted to contain the medication and having a face thereon and an outlet opening on said face which is mounted in slidable, abutting relation to the face of said dispensing unit, and
   a dispensing tube having a first open end through which medication can be discharged and a second open end mounted in slidable abutting relation to the face of said dispensing unit, the improvement wherein
   (1) said dispensing unit is mounted for rotation around an axis, and said recesses, the outlet opening of said storage chamber and the second end of said dispensing tube are all disposed in relation to said axis, such that, upon rotation of said dispensing unit, said recesses are rotated successively between operative engagement with the outlet opening of said storage chamber for reception of medication and operative engagement with the second end of said dispensing tube for discharge of medication,
   (2) there is a resilient scraper located in the outlet opening of the storage chamber in sliding, resilient contact with the face of said dispensing unit and configured and disposed relative to the axis of rotation such that it first pushes medication into the recess and then removes excess medication from above said recesses during rotation of said dispensing unit and insure that each recess contains a reproducible amount of medication,
   (3) said dispensing unit has ratchet means thereon arranged around the axis on which said unit rotates,
   (4) said device has ratchet engaging means mounted for rotation around the axis on which said dispensing unit rotates, said ratchet engaging means being in slidable spring-loaded contact with said ratchet means,
   (5) said ratchet means and ratchet engaging means are adapted to cooperate with each other such that rotation of said engaging means in one rotational direction will cause said dispensing unit to rotate in the same direction to a plurality of stations wherein at each station at least one of the recesses in said dispensing unit is in mating relation to the outlet opening in said storage chamber and another of said recesses is in mating relation to the second end of said dispensing tube and such that said engaging means will release from said ratchet means as the ratchet engaging means is rotated in the opposite rotational direction, and
   (6) the device has stop means coacting between the ratchet engaging means and the storage chamber for stoping the dispensing unit at each station and preventing it from advancing to the next station until the ratchet means has been released, the ratchet engaging means has been rotated in said opposite rotational direction, and the ratchet means corresponding to the next station has been engaged.

2. A device according to claim 1 wherein spring means are included to maintain said dosage dispensing unit in slidable abutting relationship to the outlet opening of said storage chamber and the second end of said dispensing tube.

3. A device according to claim 1 or claim 2 wherein said storage chamber is disposed relative to said dosage dispensing unit such that medication contained in the storage chamber will fall under the influence of gravity into the recesses of the dosage dispensing unit and the scrapers are arranged to scrape downwardly against the first face of said dosage dispensing unit.

* * * * *